United States Patent
Khay-Ibbat et al.

(10) Patent No.: US 10,038,648 B2
(45) Date of Patent: Jul. 31, 2018

(54) FACILITATING RETURN TO A FIRST WIRELESS NETWORK FROM A SECOND WIRELESS NETWORK AFTER PERFORMANCE OF A CIRCUIT SWITCHED FALLBACK PROCEDURE

(71) Applicant: Apple Inc., Cupertino, CA (US)

(72) Inventors: Samy Khay-Ibbat, San Francisco, CA (US); Arjuna Sivasithambaresan, Santa Clara, CA (US); Jinghua Ling, Palo Alto, CA (US); Ajaykumar S. Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 14/242,012

(22) Filed: Apr. 1, 2014

(65) Prior Publication Data
US 2014/0293961 A1    Oct. 2, 2014

Related U.S. Application Data

(60) Provisional application No. 61/807,729, filed on Apr. 2, 2013.

(51) Int. Cl.
*H04L 12/933* (2013.01)
*H04W 36/00* (2009.01)

(52) U.S. Cl.
CPC ......... *H04L 49/15* (2013.01); *H04W 36/0022* (2013.01)

(58) Field of Classification Search
CPC ................................................ H04W 36/0022
See application file for complete search history.

(56) References Cited

U.S. PATENT DOCUMENTS

| 8,868,087 B2 | 10/2014 | Cherian et al. |
| 8,903,390 B2 | 12/2014 | Yoon et al. |

(Continued)

FOREIGN PATENT DOCUMENTS

| CN | 102823297 A | 12/2012 |
| KR | 1020110054026 A | 5/2011 |

(Continued)

OTHER PUBLICATIONS

PCT Application No. PCT/US2014/032467—International Search Report & Written Opinion dated Jul. 31, 2014.

(Continued)

*Primary Examiner* — Sulaiman Nooristany
(74) *Attorney, Agent, or Firm* — Dickinson Wright RLLP

(57) ABSTRACT

Method and apparatus for facilitating return to a first wireless network from a second wireless network by a wireless communication device is provided. A method includes the wireless communication device engaging in data transfer for an application session on the first wireless network; participating in a CSFB procedure to transition from the first wireless network to the second wireless network for servicing a voice connection; buffering data received for the application session before and/or during the CSFB procedure; releasing the voice connection; discontinuing requests for downlink data for the application session in response to termination of the voice connection to provide a gap in data transfer; reselecting to the first wireless network during the gap in data transfer; using the buffered data to continue the application session during reselection; and resuming data transfer for the application session on the first wireless network after completing reselection.

20 Claims, 6 Drawing Sheets

(56) References Cited

U.S. PATENT DOCUMENTS

| | | |
|---|---|---|
| 9,344,942 B2 | 5/2016 | Santhanam et al. |
| 2005/0202823 A1 | 9/2005 | Shaheen et al. |
| 2006/0105764 A1* | 5/2006 | Krishnaswamy ....... H04L 45/22 455/424 |
| 2006/0245394 A1* | 11/2006 | Baba ................ H04W 36/0011 370/331 |
| 2010/0297979 A1 | 11/2010 | Watfa et al. |
| 2011/0103277 A1 | 5/2011 | Watfa et al. |
| 2011/0158201 A1 | 6/2011 | Yokota |
| 2011/0188451 A1 | 8/2011 | Song et al. |
| 2011/0194505 A1* | 8/2011 | Faccin ................. H04W 48/18 370/329 |
| 2012/0069731 A1 | 3/2012 | Tooher et al. |
| 2012/0115489 A1 | 5/2012 | Shuai et al. |
| 2012/0182912 A1 | 7/2012 | Watfa et al. |
| 2013/0034080 A1 | 2/2013 | Yang et al. |
| 2013/0070728 A1 | 3/2013 | Umatt et al. |
| 2013/0132837 A1* | 5/2013 | Mead ..................... G06Q 10/10 715/716 |
| 2013/0230024 A1 | 9/2013 | Lim et al. |
| 2015/0358875 A1* | 12/2015 | Kashikar ............... H04W 36/14 370/332 |

FOREIGN PATENT DOCUMENTS

| | | |
|---|---|---|
| TW | 201110749 A | 3/2011 |
| TW | 201129216 A | 8/2011 |
| TW | 201134256 A | 10/2011 |
| WO | 2012066759 | 5/2012 |

OTHER PUBLICATIONS

Supplementary European Search Report for EP 14779862, dated Jul. 1, 2016.

Taiwanese Patent Application No. 103112179—Search Report Completed Nov. 14, 2015.

Chinese Application for Invention No. 201480019102.6—First Office Action dated Dec. 29, 2017.

Korean Patent Application No. 10-2015-7027298—Non-Final Office Action dated Aug. 22, 2016.

Japanese Patent Application No. 2016-506358—Office Action dated Oct. 21, 2016.

* cited by examiner

FACILITATING RETURN TO A FIRST WIRELESS NETWORK FROM A SECOND WIRELESS NETWORK AFTER PERFORMANCE OF A CIRCUIT SWITCHED FALLBACK PROCEDURE

CROSS-REFERENCE TO RELATED APPLICATIONS

This application claims the benefit of U.S. Provisional Patent Application No. 61/807,729, filed Apr. 2, 2013, and entitled "FACILITATING RETURN TO A FIRST NETWORK FROM A SECOND NETWORK AFTER PERFORMANCE OF A CIRCUIT SWITCHED FALLBACK PROCEDURE," which is incorporated by reference herein in its entirety for all purposes.

FIELD OF THE DESCRIBED EMBODIMENTS

The described embodiments relate generally to wireless communications and more particularly to facilitating return to a first wireless network from a second wireless network after performance of a circuit switched fallback (CSFB) procedure.

BACKGROUND

Cellular wireless networks using newer radio access technology (RAT) systems, such as Long Term Evolution (LTE) systems and Long Term Evolution Advanced (LTE-A) systems as standardized by the Third Generation Partnership Project (3GPP), are being developed and deployed. Cellular wireless networks that use these newer RATs, which can be referred to as fourth generation (4G) and beyond RATs, often support faster data rates and/or newer/different sets of services than cellular wireless networks that are based on legacy RATs, such as second generation (2G) and third generation (3G) RATs, including Universal Mobile Telecommunications System (UMTS) networks and Global System for Mobile Communications (GSM) networks. However, in some deployments, LTE and other wireless networks based on newer RATs may not fully support some services that can be handled by legacy wireless networks. For example, LTE wireless networks can be designed to support packet switched communication and may not directly support circuit switched voice connections as provided by some legacy wireless networks. Accordingly, LTE wireless networks are often co-deployed in overlapping regions with legacy wireless networks, and wireless communication devices may transition between using different RATs as services or coverage may require. For example, in some deployments, LTE wireless networks are not capable of supporting voice connections. Accordingly, when a wireless communication device receives or initiates a voice connection, while connected to a wireless network that supports data sessions, but not voice connections, the wireless communication device can perform a circuit switched fallback (CSFB) procedure to transition to a legacy wireless network that supports voice connections, in order to initiate a mobile originated voice connection or to receive a mobile terminated voice connection.

Using CSFB procedures, an LTE wireless network will only provide data services, while legacy wireless networks will provide both voice services and data services. As newer wireless networks, such as LTE wireless networks, can offer faster data rates than legacy wireless networks, wireless communication devices enabled to operate on LTE wireless networks can generally prefer to stay connected to LTE wireless networks when available unless servicing an active voice connection through a legacy wireless network, in order to provide a better user experience, e.g., faster data rates via the LTE wireless network. However, after a CSFB procedure terminates and before returning to the LTE wireless network, a wireless communication device can engage in packet switched data transfers with the legacy wireless network for an application already running on the wireless communication device while connected to the legacy wireless network, e.g., for the CSFB procedure. The wireless communication device can be unable to return to the LTE wireless network following termination of the CSFB procedure until the packet switched data transfer being effected through the legacy wireless network has also concluded. In particular, a wireless communication device can require an amount of "idle" time to perform a system re-selection procedure in order to return from the legacy wireless network to the LTE wireless network. As such, a wireless communication device can remain "stuck" on a legacy wireless network for a period of time following termination of a voice connection, e.g., to service on ongoing data connection, and users of the wireless communication device can accordingly experience less than desirable data performance, via the slower legacy wireless network compared with the faster LTE wireless network. This lower performance data connection can remain for significant time periods following termination of the voice connection, even when access to an LTE wireless network that provides faster data rates than the legacy wireless network is available.

SUMMARY

Representative embodiments disclosed herein provide for facilitating return of a wireless communication device to a first wireless network from a second wireless network after performance of a CSFB procedure. In this regard, some embodiments address a scenario in which packet switched data transfer for an application session can be ongoing between the wireless communication device and a "legacy" wireless network following completion of a CSFB voice connection. In some embodiments, the application session can continue using a packet switched data connection originally established before the CSFB procedure started with the first wireless network, and continuing after the CSFB procedure started, e.g., transferred over to the second "legacy" wireless network from the first wireless network. Alternatively, the application session using the packet switched connection can start while a CSFB procedure is in process, e.g., during a CSFB voice connection with the second "legacy" wireless network, and therefore can be initially formed with the second "legacy" wireless network. The wireless communication device, in accordance with some embodiments, can be configured to discontinue or suspend data transfer for the application session following termination of the CSFB voice connection. The halting or suspension of the data transfer for the application session can provide a gap in packet switched data transfer to allow the wireless communication device to reselect from the second "legacy" wireless network to the first wireless network. Subsequently, the wireless communication device can resume packet switched data transfer for the application session via the first wireless network. The wireless communication device, in some embodiments, can be further configured to adapt performance at an application layer to reduce a potentially perceivable service interruption of the application session after termination of the CSFB voice connection, while allowing the wireless communication device to reselect from the second "legacy" wireless network back to the first wireless network. For example, the wireless communication device can be configured to buffer data received via a data connection established with the second "legacy" wireless network prior to performing reselection back to the first wireless network, and the wireless communication device can use the buffered data to continue the application session during the reselection process so as to reduce, or eliminate, a perceivable interruption of services provided by the application session to the user while reselection occurs. After reselection, data transfer for the application session can resume between the wireless communication device and the first wireless network, and the user can benefit from faster data rates for connections offered by the first wireless network.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
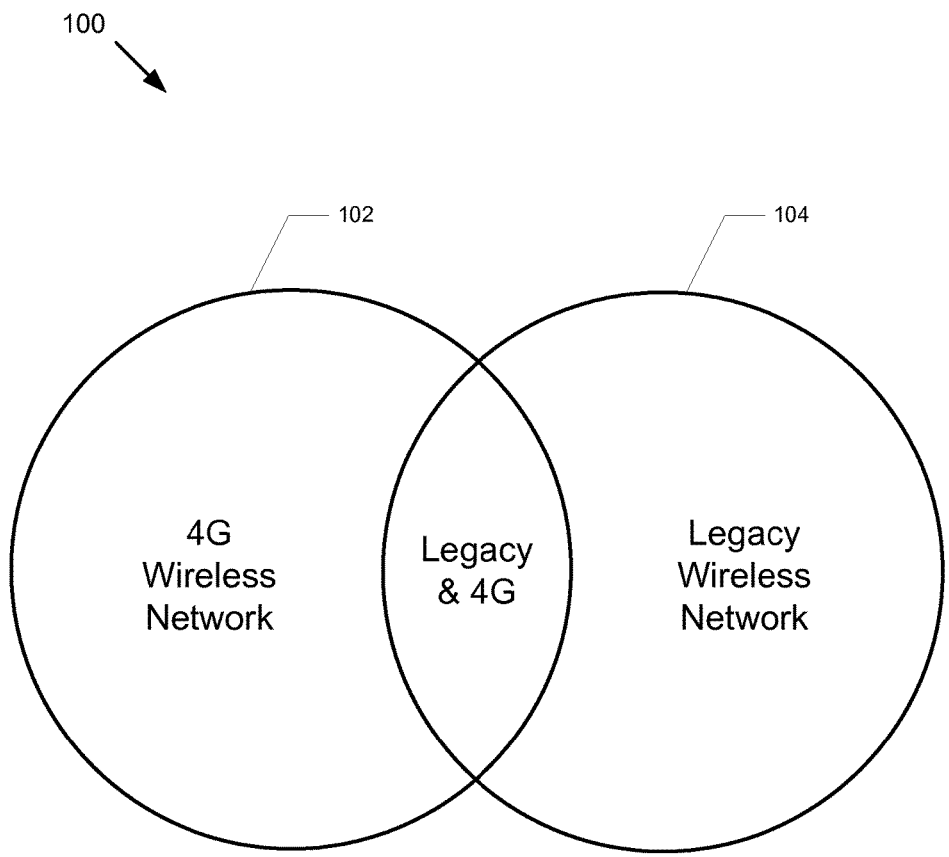
FIG. 1 illustrates overlapping coverage of a fourth generation (4G) wireless network and a legacy wireless network in accordance with some embodiments.

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for facilitating return of a wireless communication device to reconnect with a first wireless network from a second "legacy" wireless network after performing a CSFB procedure. In this regard, some example embodiments address a scenario in which packet switched data transfers for an application session can be ongoing between the wireless communication device and the second legacy wireless network following termination of a CSFB voice connection. The wireless communication device, in accordance with some embodiments, can be configured to discontinue and/or suspend ongoing data transfers with the second legacy wireless network for an application session following termination of the CSFB voice connection. By discontinuing and/or suspending data transfers, the wireless communication device can provide an "idle" time gap in the packet switched data transfer to allow the wireless communication device an opportunity to perform a reselection procedure from the second legacy wireless network back to the first wireless network. After reselecting to the first wireless network, the wireless communication device can resume packet switched data transfer via a newly established or re-established connection with the first wireless network. The wireless communication device can be further configured to adapt processing at the application layer to reduce a "user perceivable" interruption time after termination of the CSFB voice connection, while allowing reselection of the wireless communication device from the second legacy wireless network back to the first wireless network. For example, the wireless communication device can be configured to buffer data received from the second legacy wireless network prior to performing reselection back to the first wireless network. The wireless communication device can use the buffered data during the reselection process to continue the application session so as to reduce, or eliminate, perceivable interruptions of services provided by the application session to the user during the reselection process. After reselection of the wireless communication device from the second legacy wireless network back to the first wireless network, data transfers for the application session can resume via a newly established or re-established connection with the first wireless network. The user can benefit from a resumption of faster data rates that can be offered by the first wireless network rather than remaining connected to the second legacy wireless network that can provide slower data rates than the first wireless network.

FIG. 1 illustrates overlapping coverage of a fourth generation (4G) wireless network 102 and a legacy wireless network 104 in a communications system 100 in accordance with some embodiments. The 4G wireless network 102 can, for example, be a wireless network that operates in accordance with a Third Generation Partnership Project (3GPP) Long Term Evolution (LTE) wireless communication protocol, such as an LTE wireless network or an LTE-Advanced (LTE-A) wireless network, or another wireless network that provides faster data rates than one or more "legacy" wireless networks, such as second generation (2G) and third generation (3G) wireless networks. The 4G wireless network 102, in some embodiments, may not provide support for voice connections, or more particularly, in some embodiments, may not provide support for circuit-switched voice connections. The 4G wireless network 102 may provide services via packet-switched connections only, and in some embodiments, voice services via packet-switched connections may be not provided. It will be appreciated that the 4G wireless network 102 is illustrated by way of example, and not by way of limitation. In this regard, other wireless networks in existence now or that may be developed in the future, which can offer higher data rates than legacy wireless networks but which do not support circuit switched (CS) voice connections, can be substituted for the 4G wireless network 102 within the scope of the disclosure. The legacy wireless network 104 can be any legacy wireless network having a CS domain that supports CS voice connections. By way of non-limiting example, the legacy wireless network 104 can be a 3G wireless network, such as a wireless network that operates in accordance with a Wideband Code Division Multiple Access (WCDMA) or other Universal Mobile Telecommunications System (UMTS) wireless communication protocol, such as a Time Division Synchronous Code Division Multiple Access (TD-SCDMA) wireless communication protocol. As a further example, the legacy wireless network 104 can be a CDMA2000 wireless network, such as a 1×RTT wireless network, or other wireless network operating in accordance with one or more wireless communication protocols standardized by the Third Generation Partnership Project 2 (3GPP2). The legacy wireless network 104 can provide a CS domain that can support CS voice connections. As another example, the legacy wireless network 104 can be a 2G wireless network such as a wireless network that operates in accordance with a 3GPP Global System for Mobile Communications (GSM) wireless communications protocol.

The 4G wireless network 102 and the legacy wireless network 104 can each have regions of coverage represented by the respective circles illustrated in FIG. 1. The regions of coverage for the 4G wireless network 102 and the legacy wireless network 104 can overlap, such as illustrated by the overlapping portions of the circles in FIG. 1. A wireless communication device in accordance with some embodiments can operate on both the 4G wireless network 102 and on the legacy wireless network 104. Thus, for example, when the wireless communication device is in a region of overlapping coverage, the wireless communication device can be connected to the 4G wireless network 102 while engaged in an ongoing data session, e.g., for an application operating on the wireless communication device, and can perform a CSFB procedure to connect with the legacy wireless network 104 in response to the initiation of a mobile originated voice connection or a mobile terminated voice connection.

Figure 2:
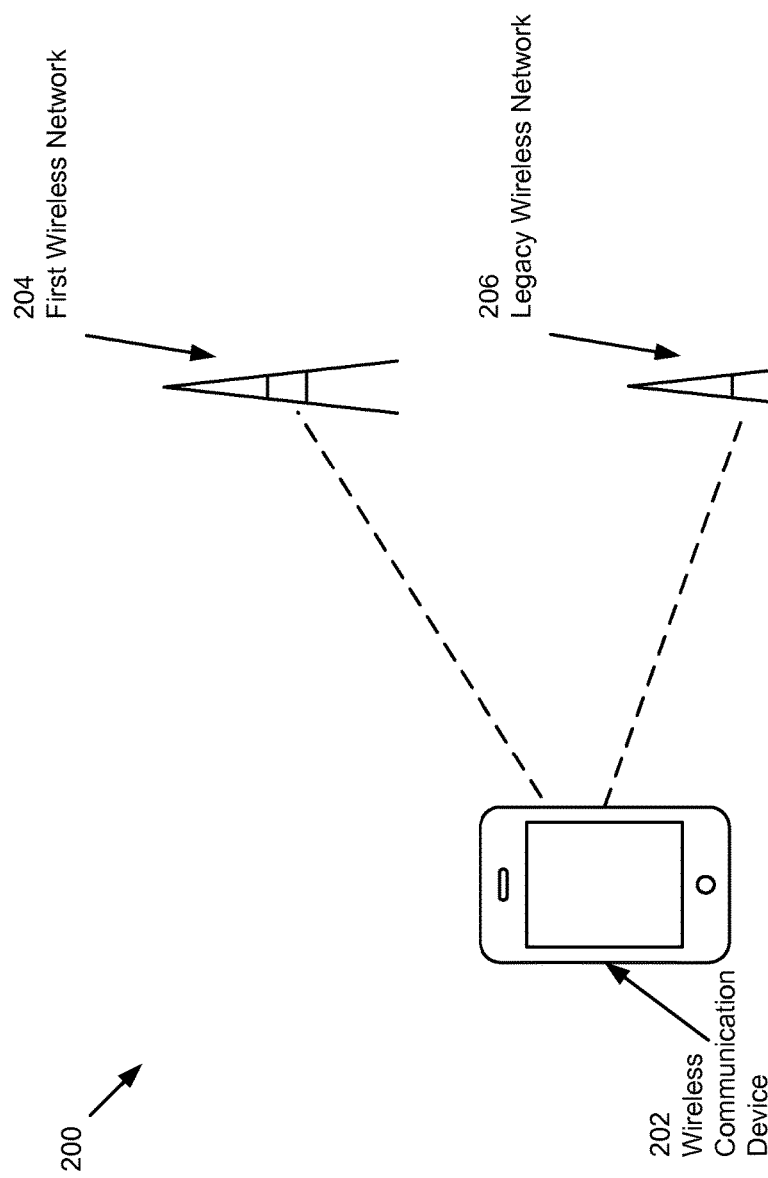
FIG. 2 illustrates an example system having multiple wireless networks to which a wireless communication device can connect in accordance with some embodiments.

FIG. 2 illustrates an example system 200 having multiple wireless communication networks to which a wireless communication device 202 can connect in accordance with some embodiments. By way of non-limiting example, the wireless communication device 202 can be a cellular phone, such as a smart phone device; a tablet computing device; a laptop-computing device; or other computing device configured to operate within both a first wireless network 204 and a legacy wireless network 206. The first wireless network 204 can be any wireless network that supports packet switched (PS) data sessions, but which does not have a CS domain for supporting CS voice connections. In some embodiments, the first wireless network 204 can offer higher theoretical data rates than the legacy wireless network 206. Thus, for example, the first wireless network 204 can be a wireless network operating in accordance with an LTE wireless communication protocol (e.g., an LTE network, an LTE-A network, or a wireless network using another present or future developed LTE technology). The first wireless network 204 can be a 4G wireless network, such as the 4G wireless network 102 illustrated in FIG. 1. The legacy wireless network 206 can be any wireless network having a CS domain to support CS voice connections. By way of non-limiting example, the legacy wireless network 206 can be a UMTS wireless network, a 3GPP2 wireless network, or another 3G wireless network. As a further example, the legacy wireless network 206 can be a GSM wireless network, another 2G wireless network, or another legacy wireless network that can support CS voice connections. In this regard, the legacy wireless network 206 can be the legacy wireless network 104 illustrated in FIG. 1.

As illustrated in FIG. 2, the wireless communication device 202 can be within signaling range of both a base station or other access point for the first wireless network 204 and a base station or other access point for the legacy wireless network 206. In this regard, the wireless communication device 202 can be located in a region of overlapping coverage of the first wireless network 204 and the legacy wireless network 206. As such, the wireless communication device 202 can connect to the first wireless network 204. In response to initiation of a CS voice connection, (e.g., a mobile originated voice connection initiated by the wireless communication device 202 or a mobile terminated voice connection placed to the wireless communication device 202), the wireless communication device 202 can participate in a CSFB procedure to transition from the first wireless network 204 to the legacy wireless network 206 so that the voice connection can be supported. The CSFB procedure can, for example, be performed as defined in a version of the 3GPP Technical Specification (TS) 23.272, e.g., 3GPP TS 23.272 Version 11.2.0 (Sep. 14, 2002), the contents of which are incorporated herein by reference in its entirety. It will be appreciated, however, that the CSFB procedure can additionally or alternatively be performed in accordance with one or more previous and/or future versions of 3GPP TS 23.272. Further, in some embodiments, the CSFB procedure can be performed in accordance with existing or future methodologies for performing a CSFB procedure that may be performed or promulgated by standardization bodies and/or industry groups other than 3GPP.

Figure 3:
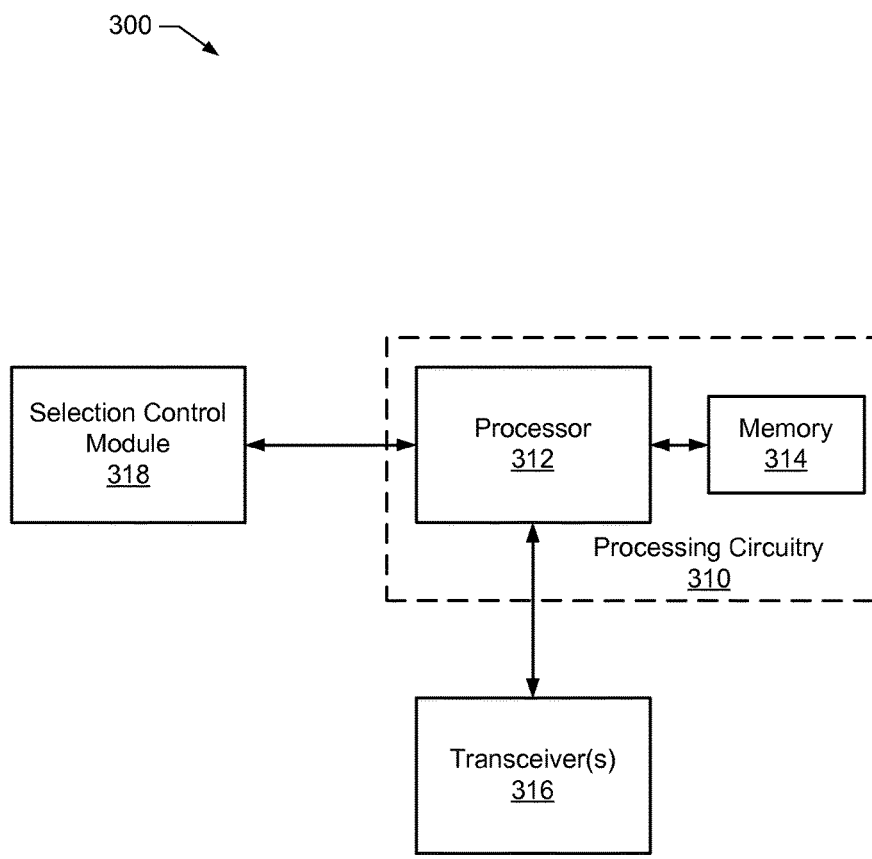
FIG. 3 illustrates a block diagram of an apparatus that can be implemented on a wireless communication device in accordance with some embodiments.

FIG. 3 illustrates a block diagram of an apparatus 300 that can be implemented on a wireless communication device 202 in accordance with some embodiments. In this regard, when implemented on a computing device, such as the wireless communication device 202, apparatus 300 can enable the computing device to operate within the system 200 in accordance with one or more embodiments. It will be appreciated that the components, devices or elements illustrated in and described with respect to FIG. 3 may not be mandatory and thus some components, devices or elements may be omitted in certain embodiments. Additionally, some embodiments can include further or different components, devices or elements beyond those illustrated in and described with respect to FIG. 3.

In some embodiments, the apparatus 300 can include processing circuitry 310 that is configurable to perform actions in accordance with one or more embodiments disclosed herein. In this regard, the processing circuitry 310 can be configured to perform and/or control performance of one or more functionalities of the apparatus 300 in accordance with various embodiments, and thus can provide means for performing functionalities of the apparatus 300 in accordance with various embodiments. The processing circuitry 310 can be configured to perform data processing, application execution and/or other processing and management services according to one or more embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset(s). In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first wireless network 204 and/or over the legacy wireless network 206. In some example embodiments, one or more components of the apparatus 300 can include a cellular wireless baseband chipset, which can enable a computing device to operate over the first wireless network 204 and/or over the legacy wireless network 206.

In some example embodiments, the processing circuitry 310 can include a processor 312 and, in some embodiments, such as that illustrated in FIG. 3, can further include memory 314. The processing circuitry 310 can be in communication with or otherwise control one or more transceivers 316 and/or a selection control module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), or some combination thereof. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly. The processor 312 of some embodiments can be configured to function as an application processor, which can execute one or more applications that can be implemented on the wireless communication device 202.

In some embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more embodiments. In some embodiments, the memory 314 can be in communication with one or more of the processor 312, the one or more transceiver(s) 316, and the selection control module 318 via one or more busses for passing information among components of the apparatus 300.

The apparatus 300 can further include one or more transceiver(s) 316. The one or more transceiver(s) 316 can enable the apparatus 300 to send wireless radio frequency signals to and receive radio frequency signals from one or more wireless networks, such as the first wireless network 204 and the legacy wireless network 206. As such, the one or more transceiver(s) 316 can be configured to support any type of cellular or other wireless communication technology that may be implemented by the first wireless network 204 and/or legacy wireless network 206. In some example embodiments, the one or more transceiver(s) 316 can include a single transceiver configured to enable the wireless communication device 202 to connect to both the first wireless network 204 and the legacy wireless network 206. Alternatively, in some embodiments, the one or more transceiver(s) 316 can include a first transceiver configured to enable the wireless communication device 202 to connect to the first wireless network 204 and a second transceiver configured to enable the wireless communication device 202 to connect to the legacy wireless network 206. In some embodiments, the one or more transceivers 316 can be included as part of a set of wireless circuitry with supporting hardware and/or software for enabling communication of the apparatus 300, e.g., as part of the wireless communication device 202, to communicate with the first wireless network 204 and the legacy wireless network 206. In some embodiments, the transceivers 316 can be configured to support communication with one or more wireless networks that support different radio access technologies that may be implemented by the one or more wireless networks.

The apparatus 300 can further include selection control module 318. The selection control module 318 can be embodied as various means, such as circuitry, hardware, a computer program product comprising a computer-readable storage medium (for example, the memory 314) storing computer readable program instructions executable by a processing device (for example, the processor 312), or some combination thereof. In some embodiments, the processor 312 (or the processing circuitry 310) can include, or otherwise control the selection control module 318. The selection control module 318 can be configured in some example embodiments to control performance of a reselection procedure to reselect to the first wireless network 204 from the legacy wireless network 206 after termination of a voice connection that resulted from a CSFB procedure. The CSFB procedure can have been performed to transition the wireless communication device 202 from the first wireless network 204 to the legacy wireless network 206 to establish the voice connection in accordance with one or more embodiments, such as embodiments described with respect to FIGS. 4 to 6. The selection control module 318 can be configured to provide information between the one or more transceivers 316 and the processing circuitry 310 (or within the processing circuitry in some embodiments). The information can include indications of "lower layer" connections being established, suspended, dropped, modified, or otherwise changing. In some embodiments, the "lower layer" connections include physical layer, medium access control (MAC) layer, link layer, network layer, or other intermediate layers of communication used to establish, control, and remove connections between the wireless communication device and one or more of the wireless networks. In some embodiments, the information includes indications of a type of connection or a type of wireless network or a quality of service or other characteristic that can affect performance of services through the connection to an application layer (or other "higher" layers). In some embodiments, "lower layer" processing can occur within the one or more transceivers 316, while "higher layer" processing can occur within the processing circuitry 310 and/or the selection control module 318.

Figure 4:
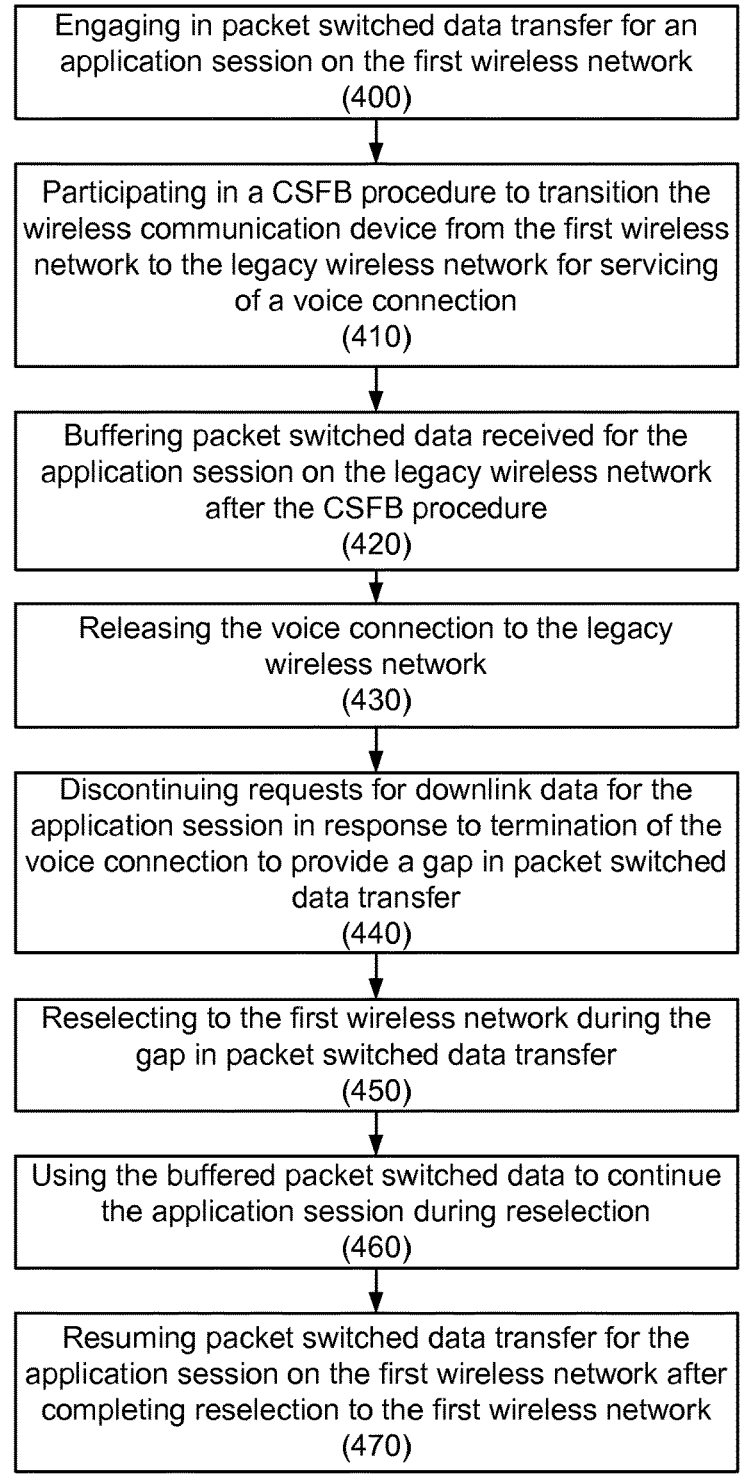
FIG. 4 illustrates a flowchart according to a representative method for facilitating return to a first wireless network from a second wireless network after performance of a CSFB procedure in accordance with some embodiments.

FIG. 4 illustrates a flowchart according to an example method for facilitating return of the wireless communication device 202 to the first wireless network 204 from the legacy wireless network 206 after performance of a CSFB procedure according to some embodiments. In this regard, FIG. 4 illustrates operations that can be performed by the wireless communication device 202 in accordance with some embodiments. One or more of processing circuitry 310, processor 312, memory 314, transceiver(s) 316, or selection control module 318 can, for example, provide means for performing the operations illustrated in and described with respect to FIG. 4. The set of steps illustrated in FIG. 4 may not all be mandatory, and thus, in some embodiments, one or more steps of the example method may be excluded.

Operation 400 can include the wireless communication device 202 initially engaging in a packet switched data transfer for an application session, the packet switched data transfer occurring between the wireless communication device 202 and the first wireless network 204. The application session can be a session for any application that can engage in packet switched data transfer over a wireless network in support of application functionality. By way of non-limiting example, the application session can be a streaming media session, such as for a streaming video application (e.g., YouTube®), a streaming audio application (e.g., Pandora®), or a similar session that supports an application running on the wireless communication device 202. As still a further example, the application session can be a real-time video and/or audio session for a communication application, such as provided by Apple® FaceTime®. As yet another example, the application session can be a session for an online gaming application. In some embodiments, the first wireless network 204 provides a packet switched connection but does not support circuit switched voice connections. In some embodiments, the first wireless network 204 provides voice services by means of directing the wireless communication device 202 to "fall back" to a legacy circuit switched wireless network in order to establish a voice connection.

Operation 410 can include the wireless communication device 202 participating in a CSFB procedure to transition the wireless communication device 202 from the first wireless network 204 to the legacy wireless network 206 for servicing of a voice connection. The voice connection can be initiated by the wireless communication device 202 (e.g., a mobile initiated voice connection), or can be a voice connection placed to the wireless communication device 202 by a remote device (e.g., a mobile terminated voice connection). The wireless communication device 202 can transition to service the voice connection while still maintaining a signaling connection (or at least not releasing one or more signaling connections and/or data connections) with the first wireless network 204, in some embodiments.

Operation 420 can include the wireless communication device 202 buffering packet switched data received for the application session on the legacy wireless network 206 after the CSFB procedure. In some example embodiments, the application session can be paused at a user level during the voice connection, and packet switched data received for the application session can be buffered by the wireless communication device 202, while the application session is paused during the voice connection. For example, playback of a non-real-time streaming media session can be paused at the user level. Additionally or alternatively, operation 410 can include the wireless communication device 202 buffering packet switched data received on the legacy wireless network 206 following termination of the CSFB voice call and prior to the wireless communication device 202 completing reselection from the legacy wireless network 206 to the first wireless network 204. In some embodiments, the wireless communication device 202 can buffer an amount of data received from the first wireless network 204 prior to the wireless communication device 202 starting the CSFB procedure in response to an initiation of a voice connection. In some embodiments, the wireless communication device 202 can receive data from the legacy wireless network 206 in parallel with the voice connection to the legacy wireless network 206. In some embodiments, a parallel data connection with the legacy wireless network 206 may not be realized, and the application session can be suspended until the wireless communication device reselects to the first wireless network 204. In some embodiments, the data rate achievable via the legacy wireless network 206 differs from the data rate achievable via the first wireless network 204, and the application session adjusts for the capabilities of the wireless network to which an active data connection exists, e.g., by rate adapting for seamlessly transitioning between the first wireless network 204 and the legacy wireless network 206. In some embodiments, an application layer adjusts the application session during a CSFB procedure and readjusts the application session after the CSFB procedure to accommodate data transfer via different data connections available during and after the CSFB procedure.

Operation 430 can include the wireless communication device 202 releasing the voice connection on the legacy wireless network 206. Operation 430 can be initiated by the wireless communication device 202 and/or by the legacy wireless network 206 in response to termination of the voice connection.

Operation 440 can include the wireless communication device 202 discontinuing requests for downlink data for the application session in response to termination of the voice connection to provide a gap in packet switched data transfer. In this regard, the application layer can temporarily pause data transfer for the application session to provide a gap in data transfer to allow reselection of the wireless communication device 202 from the legacy wireless network 206 back to the first wireless network 204. Discontinuing requests for downlink data and pausing data transfer in this manner can at least temporarily stop further data radio bearer (DRB) packet data unit (PDU) exchanges to provide the gap in data transfer.

Operation 450 can include the wireless communication device 202 reselecting from the legacy wireless network 206 back to the first wireless network 204 during the gap in packet switched data transfer. Operation 450 can include the wireless communication device 202 performing a location area update (LAU) procedure, in some embodiments. Operation 450 can additionally or alternatively include the wireless communication device 202 sending a signaling connection release indication (SCRI) to the legacy wireless network 206 to trigger a radio resource control (RRC) connection release procedure to allow reselection of the wireless communication device 202 from the legacy wireless network 206 back to the first wireless network 204. In some embodiments, such as embodiments in which the legacy wireless network 206 is a UMTS wireless network, operation 450 can include the wireless communication device 202 transitioning to a Cell_PCH (Cell Paging Channel) state to allow reselection of the wireless communication device 202 from the legacy wireless network 206 back to the first wireless network 204.

Operation 460 can include the wireless communication device 202 using the buffered packet switched data accumulated during operation 420 to continue the application session during reselection of the wireless communication device 202 from the legacy wireless network 206 back to the first wireless network 204. In some embodiments, such as when the application session is suspended during the voice connection, the wireless communication device 102 can use packet switched data stored before the CSFB procedure (e.g., from the first wireless network) as part of the application session during the transition back to the first wireless network 204. In some embodiments, when the application session is a streaming media session, the buffered data can be played out at the user level such that the application session appears as ongoing to the user even though no new packet data may be received by the wireless communication device 202 for the application session from the legacy wireless network 206 or from the first wireless network 204 during the reselection procedure from the legacy wireless network 206 back to the first wireless network 204. In some embodiments in which an application session is paused during the voice connection with the legacy wireless network 206, the buffered packet data can be used to resume the application session after termination of the voice connection with the legacy wireless network 206.

Operation 470 can include the wireless communication device 202 resuming packet switched data transfer for the application session on the first wireless network 204 after completing reselection to the first wireless network 204. In this regard, the buffered data can be used to service the application session until data transfer is resumed following completion of reselection from the legacy wireless network 206 to the first wireless network 204. The application session can appear seamless to the user during and following reselection, as the buffered data can be used to bridge the gap in data transfer until data transfer resumes between the wireless communication device 202 and the first wireless network 204. Further, as the first wireless network 204 can offer faster data rates, in some embodiments, than can be provided by the legacy wireless network 206, a user experience of the application session on the wireless communication device 202 can be improved through reselection to the first wireless network 204 rather than remaining on the legacy wireless network 206 for an extended period of time. The performance of the application session, or other "perceivable" benefits, such as faster data rates, receipt and playback of higher bit rate (e.g., higher resolution) video, and receipt and playback of higher bit rate audio can be realized at least in part by the methods and apparatus disclosed herein.

It will be appreciated that some embodiments provide for additional or alternative modification of application layer parameters to improve user experience during and/or subsequent to a CSFB voice connection. For example, in the case of a real-time communication session, such as a FaceTime® connection, the application layer can adjust a codec to use different parameters in preparation for the CSFB connection with the legacy wireless network 206 and/or in preparation for reselection back to the first wireless network 204. By adjusting the properties of the codec or other "real-time" operations that can affect data rates, data quality, etc., the real-time communication session can be more robust to operating with different (e.g., lower) bit rates on the legacy wireless network 206 and/or to an interruption in data transfer during reselection from the legacy wireless network 206 to the first wireless network 204 (e.g., during operations 440-450) following release of the voice connection. In some embodiments, the application layer adjusts the application session to adapt packet data generation and/or packet data consumption by the application sessions. In some embodiments, the application layer adapts to a data connection used by the application session, e.g., through the first wireless network 204 at a first data rate and/or through the legacy wireless network 206 at a second data rate. As another example, a gaming application session can prepare for an interruption in data transfer during reselection from the legacy wireless network 206 back to the first wireless network 204 (e.g., during operations 440-450) by using interpolation to estimate character movements during the interruption of data transfer so that the execution of the gaming application session appears to the user as though game play continues as normal during reselection from the legacy wireless network 206 back to the first wireless network 204. As still a further example, a chat application session can delay opening of a new chat session requested by a user until reselection from the legacy wireless network 206 back to the first wireless network 204 completes.

Figure 5:
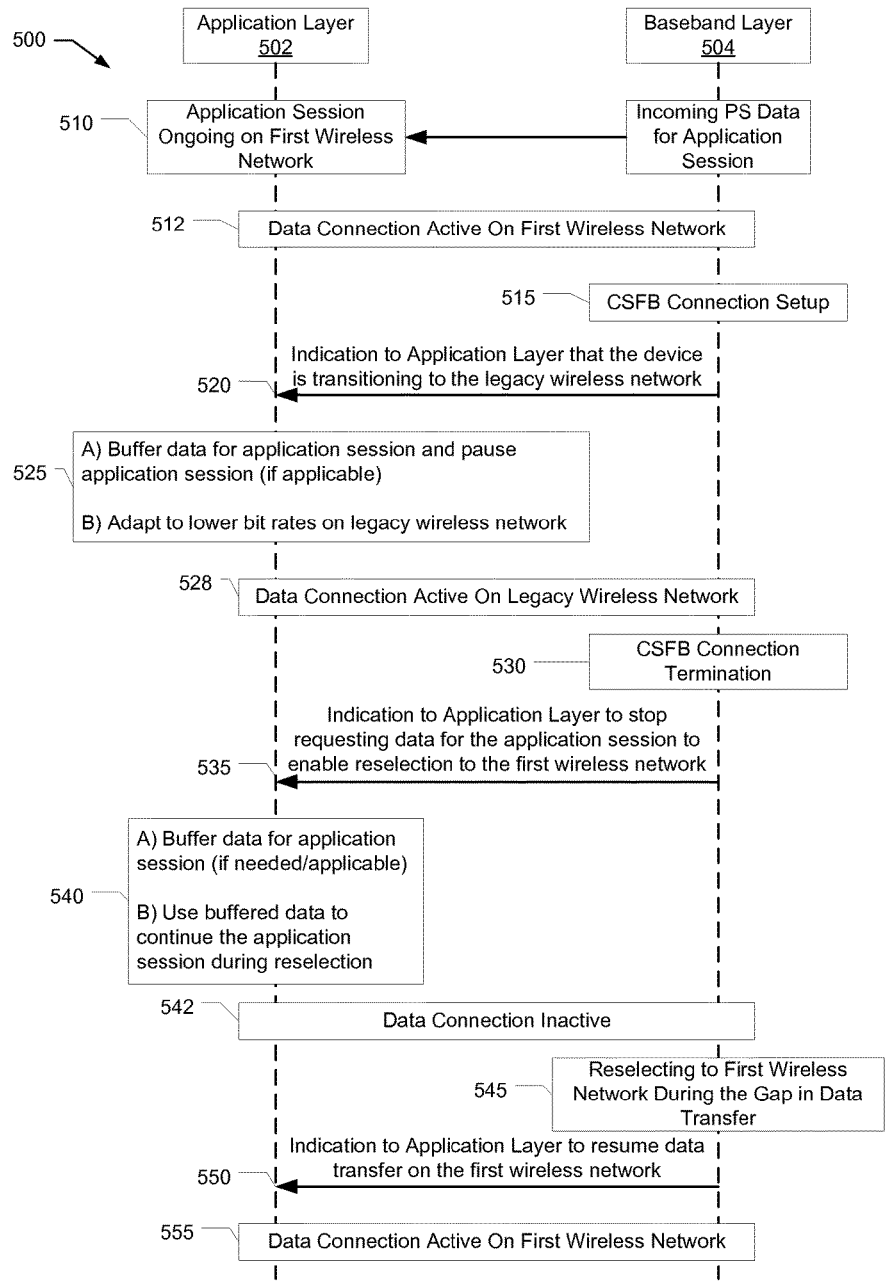
FIG. 5 illustrates a signaling diagram according to a representative method for facilitating return to a first wireless network from a second wireless network after performance of a CSFB procedure in accordance with some embodiments.

Some example embodiments utilize coordination between an application layer (which can be considered in some embodiments as part of a set of "higher" layer functions) and a baseband layer (which can be considered in some embodiments as part of a set of "lower" layer functions) to facilitate return of the wireless communication device 202 from the legacy wireless network 206 back to the first wireless network 204 following termination of a CSFB connection. FIG. 5 illustrates a signaling diagram 500 according to a representative method for facilitating return of the wireless communication device 202 to a first wireless network 204 from a second legacy wireless network 206 after performance of a CSFB procedure according to some embodiments.

At operation 510, an application session can be ongoing at an application layer 502 in the wireless communication device 202. The wireless communication device 202 can be connected to a first wireless network 204 through which data can be communicated to and from the wireless communication device 202 to support services provided by the application session. Packet switched data for the application session can be incoming at the baseband layer 504 via the first wireless network 204 to the wireless communication device 202, and the packet switched data can be passed from the baseband layer 504 to the application layer 502. As indicated by operation 512, a data connection that provides for the communication of packet switched data for the application session can be active on the first wireless network 204. Operation 515 can include the baseband layer 504 performing a CSFB connection setup in response to the initiation of a voice connection for the wireless communication device 202. In some embodiments, the first wireless network 204 may not provide a capability for voice connections for the wireless communication device 202 and may require the wireless communication device 202 to "fall back" to a legacy wireless network that provides for voice connections. The baseband layer 504 can provide an indication to the application layer 502 that the wireless communication device 102 is transitioning to the legacy wireless network 206 for servicing of the voice connection, at operation 520. The application layer 502 can use the indication provided by the baseband layer 504 to modify application session parameters and/or otherwise adapt the application session to the legacy wireless network 206, at operation 525. In some embodiments, when the application session is a non-real-time session that can be paused, such as a streaming media session, operation 525 can include the application layer 502 pausing the application session (e.g., from the user perspective), buffering data to provide to the baseband layer 504 until a new connection is established via the legacy wireless network 206 (or when no connection is established until returning to the first wireless network 204), adjusting parameters of operation of the application layer to match a connection to be established, while being established, or when established with the legacy wireless network 206, and buffering data arriving for the application session via the legacy wireless network 206. In some embodiments, operation 525 can additionally or alternatively include the application layer 502 adapting to lower bit rates on the legacy wireless network, such as by switching to a different codec, switching to a lower bit rate data stream (e.g., to a lower resolution video stream), and/or the like. Operation 528 indicates that a data connection with the legacy wireless network 206 can be established in parallel with the voice connection to the legacy wireless network 206, in some embodiments. The data connection with the legacy wireless network 206 can provide data for the application layer 502 via the baseband layer 504 in order to support continuation at least in part of the application session. In some embodiments, a data connection with the legacy wireless network 206 is not established, and the application session can be suspended during the voice connection with the legacy wireless network 206.

Operation 530 can include termination of the CSFB voice connection by the wireless communication device 202 at the baseband layer 504. Termination of the CSFB voice connection can occur as a result of an input from the user of the wireless communication device 202 or based on a signal received from the legacy wireless network 206. The baseband layer 504 can provide an indication to the application layer 502 to stop requesting data for the application session to enable reselection of the wireless communication device 202 from the legacy wireless network 206 back to the first wireless network 204, at operation 535. The application layer 502 can use the indication to adapt the application session to withstand the interruption in data transfer during the reselection procedure without impacting or minimally impacting the user, at operation 540. For example, the application layer 502 can buffer data (e.g., in addition to any data buffered in operation 525 or in lieu of buffering data at operation 525) for the application session prior to discontinuing requests for data for the application session. The buffered data can be used to continue the application session from the user perspective during the transition of the connection of the wireless communication device 202 from the legacy wireless network 206 back to the first wireless network 204. When the application is suspended during the CSFB voice connection with the legacy wireless network 206, e.g., when no data connection is provided during the CSFB voice connection, the application can use the buffered data after termination of the CSFB voice connection to "restart" the application session and provide a at least in part a continuation of the application session while a connection to the first wireless network 204 is achieved by the reselection process. When the application session had been paused from the user perspective during the voice connection, the application session can be resumed following termination of the voice connection (e.g., by using the buffered data).

Operation 545 can include the baseband layer 504 reselecting to the first wireless network 204 from the legacy wireless network 206 during the gap in data transfer. In some embodiments, the application layer 502 and/or baseband layer 504 can be configured to provide a gap in data transfer of a predefined length sufficient to allow for reselection from the legacy wireless network 206 to the first wireless network 204. The data transfer gap length can, for example, depend upon a wireless carrier, one or more wireless network characteristics, one or more market characteristics, a configuration of the wireless communication device 202, and/or other factors that can affect a length of time needed to perform a reselection procedure between the legacy wireless network 206 and the first wireless network 204. Following reselection from the legacy wireless network 206 to the first wireless network 204, the baseband layer 504 can provide an indication to the application layer 502 that reselection has completed, and data transfer can resume on the first wireless network 204, at operation 550. The application layer 502 can accordingly resume requesting data for the application session. Further, if the application session was modified to use lower bit rates on the legacy wireless network 206, such as by switching to a lower resolution codec or using lower bit rate stream, the application layer 502 can return to a higher bit rate/resolution stream on the first wireless network 204.

Figure 6:
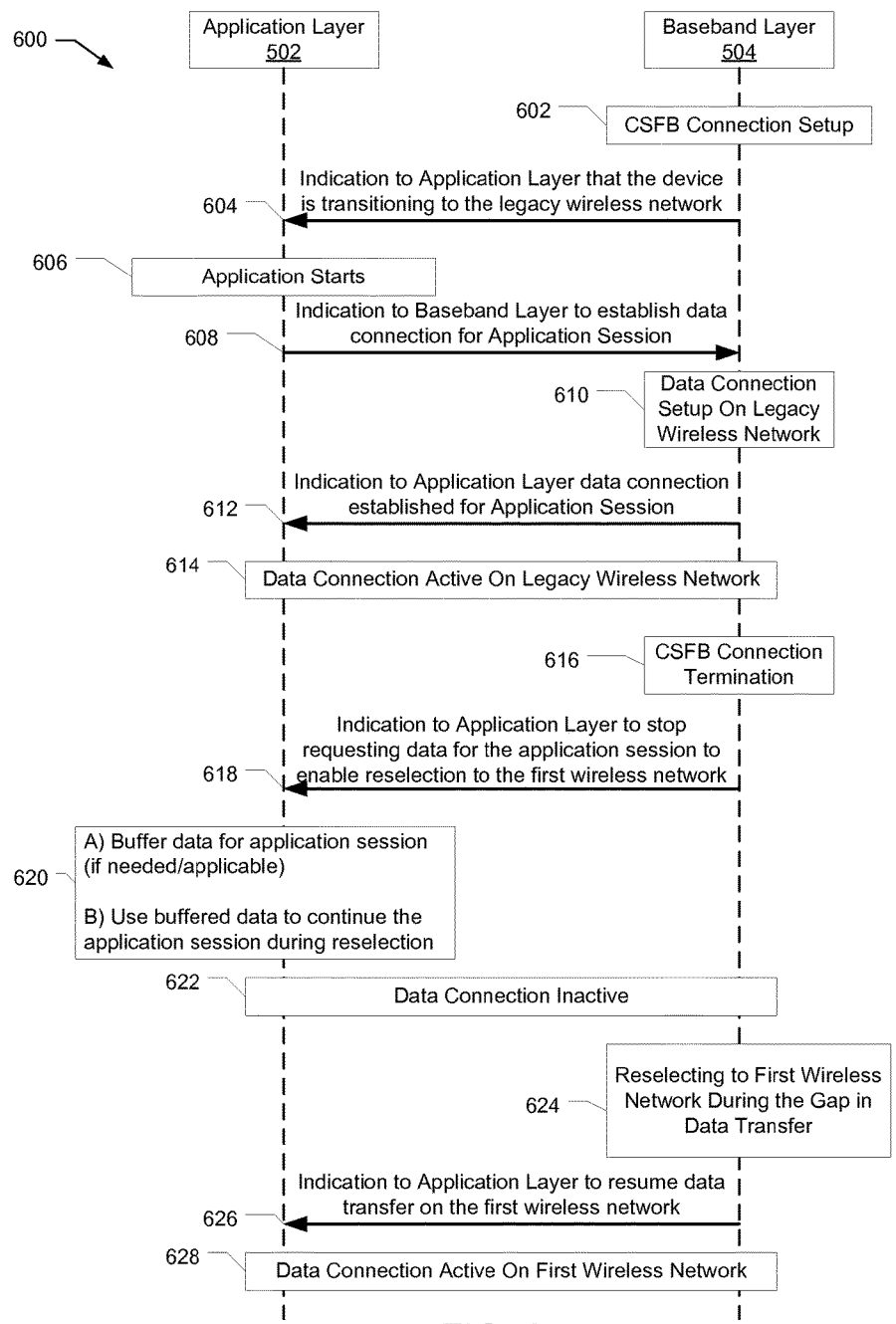
FIG. 6 illustrates a signaling diagram according to another representative method for facilitating return to the first wireless network from the second wireless network after performance of a CSFB procedure in accordance with some embodiments.

FIG. 6 illustrates another signaling diagram 600 according to a representative method for facilitating return of the wireless communication device 202 to a first wireless network 204 from a second legacy wireless network 206 after performance of a CSFB procedure according to some embodiments. FIG. 6 differs from FIG. 5 in that an active data connection between the wireless communication device 202 and the first wireless network 204 may not exist when the CSFB procedure starts. The wireless communication device 202, in some embodiments, can be associated with both the first wireless network 204 and the legacy wireless network 206, but not be actively connected by a voice or data connection at the start. For example, the wireless communication device 202 can have a radio resource control connection (for signaling) with the first wireless network 204. In some embodiments, the wireless communication device 202 initiates a CSFB procedure at operation 602. The CSFB connection setup can occur as a result of a user input, e.g., to establish a voice connection, or by the first wireless network 204, e.g., to "fall back" to the legacy wireless network 206 in order to receive a voice connection, or based on the wireless communication device 202 receiving a signaling message from the legacy wireless network 206, e.g., during a "tune away" time period to listen for paging messages from the legacy wireless network 206. The baseband layer 504 of the wireless communication device can inform the application layer that the wireless communication device 202 is transitioning to the legacy wireless network 206 at operation 604. After transitioning to the legacy wireless network 206 (or while the transition is occurring) an application session can start at operation 606 on the wireless communication device 202. The application session can require, in some embodiments, a data connection by which packet data can be exchanged with a wireless network in order to provide one or more services for a user of the wireless communication device 202. The application layer, in operation 608, can provide an indication to the baseband layer 504 to establish a data connection to support the function of the application session. At operation 610, the baseband layer can establish a data connection between the wireless communication device 202 and the legacy wireless network 206. At operation 612, the baseband layer 504 can indicate to the application layer 502 that the data connection is established with the legacy wireless network 206 to support data exchange for the application session. In step 614 the data connection can be active between the wireless communication device 202 and the legacy wireless network 206. At operation 616, the baseband layer can terminate the CSFB connection, which was established as part of the CSFB connection setup in step 612, e.g., to support a voice connection for the wireless communication device 202. The data connection for the application session can still be active when the CSFB connection termination 616 begins. The baseband layer 504 at step 618 can provide an indication to the application layer 502 that the CSFB connection (and thus any connections to the legacy wireless network 206) can be terminated. The baseband layer 504 can provide the indication to the application layer 502 so that the application layer 502 can provide a buffering of data for the application session, if required or applicable for the application session. The application layer 502 can suspend, halt, modify, or otherwise adjust the application session during a time period that permits the wireless communication device 202 to transition from the legacy wireless network 206 to the first wireless network 204 in order to continue the application session on the first wireless network 204. In some embodiments, data connections for the wireless communication device 202 can be preferably be used on the first wireless network 204, which can provide higher data rates, higher quality of service, or other preferred properties for the data connection that supports the application. Thus, while the application session may begin on the legacy wireless network 206, because the wireless communication device 202 was in the midst of a CSFB procedure when the application session began the wireless communication device 202 can be configured to prefer to use a data connection with the first wireless network 204, when available, which can be realized when the CSFB procedure terminates. The data connection for the wireless communication device 202 can be suspended, terminated, or otherwise inactive as indicated, at operation 622, so that the application layer 502 can use buffered data to continue the application session during the reselection to the first wireless network 204 from the legacy wireless network 206. The baseband layer 504 can reselect to the first wireless network during the gap in data transfer as indicated by operation 624. Upon completion of reselection, a new data connection for the application session can be established with the first wireless network 204 by the baseband layer 504, the new data connection having, in some embodiments, a different data rate, quality of service, or other performance characteristic that was provided by the data connection to the legacy wireless network 206. The baseband layer 204 can indicate to the application layer to resume data transfer using the new data connection to the first wireless network in step 626. The new data connection for the application session can be active via the first wireless network 204 as indicated by operation 628. In some embodiments, the application layer adapts properties of the application session for the wireless communication device 202 to match one or more performance characteristics of the new data connection to the first wireless network 204, e.g., adapt to higher bit rates, adapt to a different quality of service, adapt to a different bit/packet/block error rate, adapt to a different level of signal to noise/interference ratio, etc. In some embodiments, the baseband layer 504 provides information about the new data connection to the application layer 502 to facilitate the adaption of the characteristics of the application session to match to the new data connection established with the first wireless network 204.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data that can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for facilitating switching between a first wireless network from a second wireless network by a wireless communication device, the method comprising the wireless communication device:
engaging in packet switched data transfer for an application session via the first wireless network;
adjusting one or more application layer parameters for the application session to reduce packet data generation or consumption by the application session in advance of a Circuit Switched Fallback (CSFB) procedure to transition the wireless communication device from the first wireless network to the second wireless network, wherein the adjusting is responsive to receipt of an indication at an application layer from a baseband layer that the wireless communication device will participate in the CSFB procedure to transition to the second wireless network to service a voice connection;
participating in the CSFB procedure to service the voice connection via the second wireless network in parallel with a data connection for continuing the application session via the second wireless network;
buffering packet switched data received for the application session via the second wireless network;
releasing the voice connection with the second wireless network;
discontinuing requests to the second wireless network for downlink data for the application session in response to termination of the voice connection to provide a gap in packet switched data transfer;
reselecting to the first wireless network during the gap in packet switched data transfer;
using the buffered packet switched data to continue the application session during reselection;
readjusting the one or more application layer parameters for the application session to increase the packet data generation or consumption by the application session after reselection from the second wireless network to the first wireless network; and resuming packet switched data transfer for the application session via the first wireless network after completing reselection to the first wireless network, wherein the first wireless network comprises a Long Term Evolution (LTE) wireless network and the second wireless network comprises a legacy non-LTE wireless network.

2. The method of claim 1, further comprising the wireless communication device:

pausing the application session during the voice connection; and wherein buffering packet switched data comprises buffering packet switched data received for the application session via the second wireless network while the application session is paused during the voice connection.

3. The method of claim 1, wherein buffering packet switched data comprises buffering packet switched data received for the application session via the second wireless network after releasing the voice connection and before reselecting to the first wireless network.

4. The method of claim 1, further comprising the wireless communication device:

providing the indication from the baseband layer to the application layer that the wireless communication device is transitioning to the second wireless network to service the voice connection.

5. The method of claim 1, further comprising the wireless communication device:

providing an indication from the baseband layer to the application layer following release of the voice connection to stop requesting packet switched data for the application session to enable the reselection; and responsive to the indication, using the buffered packet switched data at the application layer to continue the application session during reselection.

6. The method of claim 1, further comprising the wireless communication device:

adapting packet data generation or packet data consumption by the application session to a lower data rate of the data connection on the second wireless network for use during the CSFB procedure; and adapting packet data generation or packet data consumption by the application session to a higher data rate of a subsequent data connection on the first wireless network for use after the CSFB procedure terminates.

7. The method of claim 6, wherein adapting packet data generation or packet data consumption comprises adjusting a codec used for the application session.

8. The method of claim 7, wherein the application session comprises a real-time communication session or a streaming media session.

9. A wireless communication device comprising:

one or more transceivers configured to send data to and receive data from a first wireless network and a second wireless network; and processing circuitry coupled with the one or more transceivers, the processing circuitry configured to cause the wireless communication device to:

establish a first data connection with the first wireless network;

transfer data for an application session via the first data connection with the first wireless network;

adjust one or more application layer parameters for the application session to reduce packet data generation or consumption by the application session in advance of a Circuit Switched Fallback (CSFB) procedure to transition the wireless communication device from the first wireless network to the second wireless network, wherein adjustment of the one or more application layer parameters is responsive to receipt of a first indication at an application layer from a baseband layer that the wireless communication device will participate in the CSFB procedure to transition to the second wireless network to service a voice connection;

participate in the CSFB procedure to service the voice connection via the second wireless network in parallel with a data connection for continuing the application session via the second wireless network;

buffer a set of packet data for the application session;

reselect to the first wireless network from the second wireless network;

use the buffered set of packet data to continue the application session during the reselection;

establish a second data connection or re-establish the first data connection with the first wireless network;

readjust the one or more application layer parameters for the application session to increase the packet data generation or consumption by the application session after reselection to the first wireless network; and transfer data for the application session via the second data connection or via the re-established first data connection with the first wireless network, wherein the first wireless network comprises a Long Term Evolution (LTE) wireless network and the second wireless network comprises a legacy non-LTE wireless network.

10. The wireless communication device of claim 9, wherein the first wireless network operates in accordance with a Long Term Evolution (LTE) wireless communication protocol, and the second wireless network operates in accordance with a legacy third generation (3G) or second generation (2G) wireless communication protocol.

11. The wireless communication device of claim 9, wherein the first wireless network provides packet switched data transfer, and the second wireless network provides circuit switched voice connections.

12. The wireless communication device of claim 9, further comprising the processing circuitry configured to cause the wireless communication device to:

provide the first indication from the baseband layer to the application layer that the wireless communication device will participate in the CSFB procedure; and responsive to the first indication from the baseband layer, adjust operation of the application session in preparation for transitioning to the second wireless network.

13. The wireless communication device of claim 12, further comprising the processing circuitry configured to cause the wireless communication device to:

provide a second indication from the baseband layer to the application layer following release of the voice connection with the second wireless network to facilitate reselection to the first wireless network;

wherein the processing circuitry is configured to cause the wireless communication device to use the set of buffered packet data at the application layer to continue the application session during the reselection in response to the second indication.

14. The wireless communication device of claim 9, further comprising the processing circuitry configured to cause the wireless communication device to:

pause the application session during the CSFB procedure; and restart the application session following the CSFB procedure.

15. A non-transitory computer readable storage medium having computer program code stored thereon, the computer program code configured to, when executed by processing circuitry implemented on a wireless communication device, cause the wireless communication device to:

establish a data connection with a first wireless network for an application session;

adjust one or more application layer parameters for the application session to reduce packet data generation or consumption by the application session in advance of a Circuit Switched Fallback (CSFB) procedure to transition the wireless communication device from the first wireless network to a second wireless network, wherein adjustment of the one or more application layer parameters is responsive to receipt of an indication at an application layer from a baseband layer that the wireless communication device will participate in the CSFB procedure to transition to the second wireless network to service a voice connection;

participate in the CSFB procedure to service the voice connection via the second wireless network in parallel with a data connection for continuing the application session via the second wireless network;

buffer a set of packet data for the application session;

release the voice connection with the second wireless network;

discontinue requests to the second wireless network for downlink data for the application session in response to termination of the voice connection to provide a gap in packet switched data transfer;

reselect from the second wireless network back to the first wireless network;

use the buffered set of packet data to continue the application session while reselecting to the first wireless network;

readjust the one or more application layer parameters for the application session to increase the packet data generation or consumption by the application session after reselection from the second wireless network to the first wireless network; and resume packet data transfer for the application session via the first wireless network after completing reselection to the first wireless network, wherein the first wireless network comprises a Long Term Evolution (LTE) wireless network and the second wireless network comprises a legacy non-LTE wireless network.

16. The method of claim 1, wherein the adjusting the one or more application layer parameters further comprises interpolating character movements of a gaming application to allow continuous game play during transitions between the first wireless network and the second wireless network.

17. The method of claim 1, wherein the adjusting the one or more application layer parameters further comprises delaying initiation of a second application session requested by a user of the wireless communication device until reselection from the second wireless network to the first wireless network completes.

18. The wireless communication device of claim 9, wherein the wireless communication device:

adjusts the one or more application layer parameters for the application session to a lower data rate of the data connection on the second wireless network, and readjusts the one or more application layer parameters for the application session to a higher data rate of the second data connection or the re-established first data connection on the first wireless network.

19. The wireless communication device of claim 9, wherein the wireless communication device further adjusts the one or more application layer parameters by at least interpolating character movements of a gaming application to allow continuous game play during transitions between the first wireless network and the second wireless network.

20. The wireless communication device of claim 9, wherein the wireless communication device further adjusts the one or more application layer parameters by at least delaying initiation of a second application session requested by a user of the wireless communication device until reselection from the second wireless network to the first wireless network completes.

* * * * *